United States Patent [19]

Langlois

[11] 3,832,888

[45] Sept. 3, 1974

[54] ACOUSTICAL IMAGING EQUIPMENT CAPABLE OF INSPECTING AN OBJECT WITHOUT SUBMERGING THE OBJECT IN A LIQUID

[75] Inventor: Gary N. Langlois, Richland, Wash.

[73] Assignee: Holosonics, Inc., Richland, Wash.

[22] Filed: Jan. 17, 1973

[21] Appl. No.: 324,284

[52] U.S. Cl............ 73/67.5 H, 340/5 H, 340/5 MP, 73/67.5 R
[51] Int. Cl. ........................................... G01n 29/04
[58] Field of Search........... 73/67.5 R, 67.5 H, 67.6; 340/5 H, 5 MP

[56] References Cited
UNITED STATES PATENTS

| 2,532,507 | 12/1950 | Meunier.................... 73/67.5 R UX |
| 3,493,073 | 2/1970 | Wolfe et al. ............... 73/67.5 H UX |
| 3,585,847 | 6/1971 | Brenden.......................... 73/67.5 H |
| 3,721,312 | 3/1973 | St. John...................... 73/67.5 H X |

OTHER PUBLICATIONS

H. Clements, Book–Acoustical Holography, pp. 147–151, Vol. 3, Plenum Press, N.Y.–London, 1971.
P. S. Green et al., Book–Acoustical Holography, p. 97–105, Vol. 4, Plenum Press, N.Y.–London, 1972.

Primary Examiner—Richard C. Queisser
Assistant Examiner—John P. Beauchamp
Attorney, Agent, or Firm—Wells, St. John & Roberts

[57] ABSTRACT

Acoustical imaging equipment is described for inspecting the internal structure of an object without submerging the object in a liquid. The object is placed in an air space between two membrane coupling members that are deformable to the contour of the object. A mechanism is provided to move at least one of the membrane coupling members toward the other membrane to physically contact and deform to the contour of the object to couple the object acoustically to the membrane. Acoustical transmitting liquid is provided to the membrane coupling members to transmit acoustical wave energy from a transducer through the object to a detector sensitive to the acoustical wave energy. A first acoustical lens is positioned in the path of the object modified acoustical beam and has a focal point between the two membranes. A second acoustical lens is positioned in the path of the object modified acoustical beam between the first acoustical lens and the acoustical detector in which the second acoustical lens has a focal point at the detection plane for focusing acoustical rays from the first acoustical lens in the detection plane. A means for adjusting the position of the first acoustical lens enables the apparatus to image various planes throughout the object at the detection plane without changing the magnification of the image.

4 Claims, 5 Drawing Figures

ACOUSTICAL IMAGING EQUIPMENT CAPABLE OF INSPECTING AN OBJECT WITHOUT SUBMERGING THE OBJECT IN A LIQUID

BACKGROUND OF THE INVENTION

This invention relates to improvements in acoustical imaging techniques and more particularly to acoustical holographic equipment utilizing liquid surface techniques.

The basic techniques relate to systems that are described in pending U.S. Pat. application Ser. No. 569,914 filed Aug. 3, 1966; No. 820,862 filed May 1, 1969, now U.S. Pat. No. 3,721,312; No. 123,190 filed Mar. 11, 1971; No. 123,191 filed Mar. 11, 1971, now U.S. Pat. No. 3,765,403 U.S. Pat. No. 3,561,257; U.S. Pat. 3,687,219 and U.S. Pat. No. 3,585,847. Much of the basic theory is described in the publication "An Introduction to Acoustical Holography" by B. P. Hildebrand and B. B. Brenden, Plenum Press, New York, N.Y., 1972.

Most of such techniques have been described in relation to submergible systems in which the object is submerged in acoustical transmitting liquid.

One of the objects of this invention is to provide an improved apparatus for examining objects utilizing acoustical wave energy in which the object is not submerged in an acoustical transmitting liquid.

It is an additional object of this invention to provide a non-submergible acoustical imaging apparatus whereby the system can be focused upon any plane in the object without changing the magnification of the system.

A further object of this invention is to provide an improved acoustical imaging apparatus for conveniently inspecting interior structure of objects for medical diagnostic purposes or for nondestructive inspection with a minimum of inconvenience and setup time.

These and other objects and advantages of this invention will become apparent upon the reading of the following detailed description of a preferred embodiment.

BRIEF DESCRIPTION OF THE DRAWINGS

A preferred embodiment of this invention is illustrated in the accompanying drawings, in which.

DETAILED DESCRIPTION OF A PREFERRED EMBODIMENT

Figure 1:
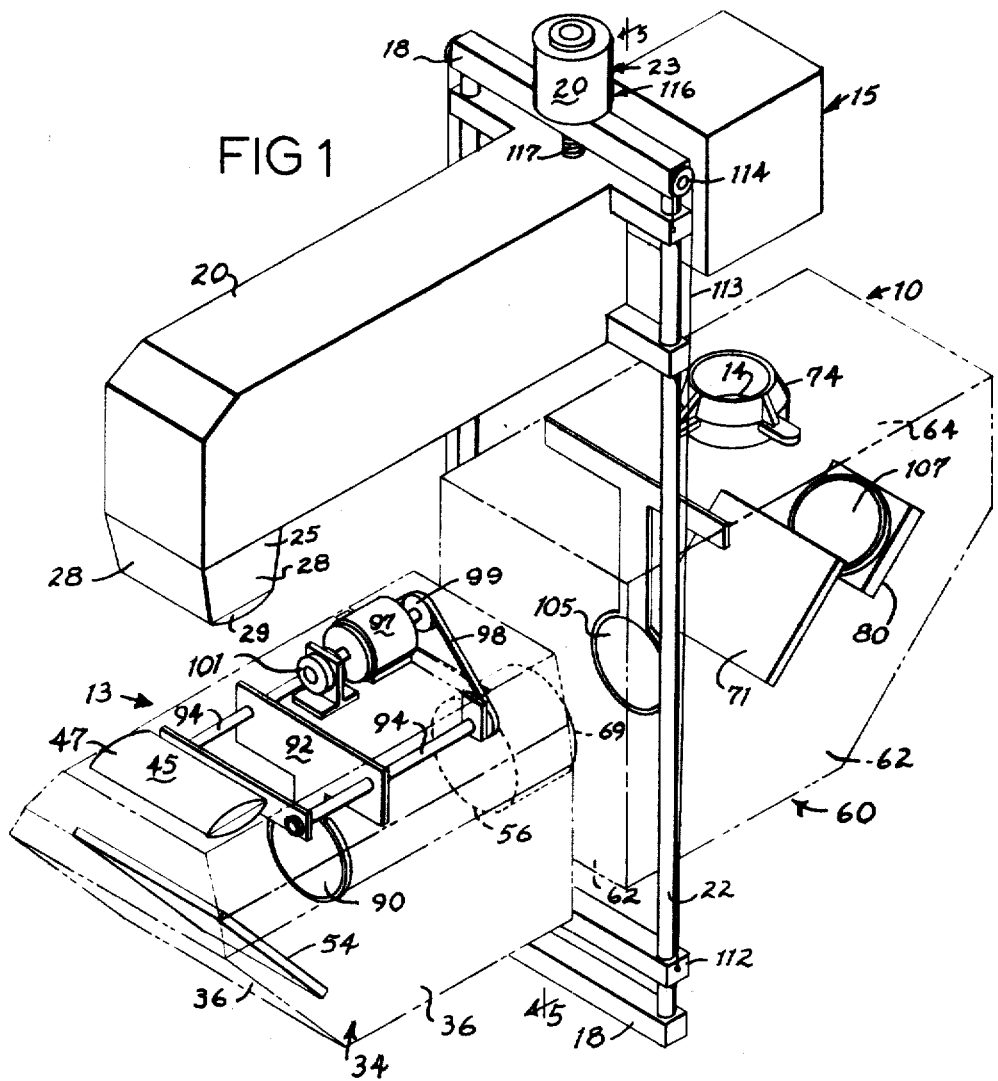
FIG. 1 is a diagrammatic isometric view of an acoustical holographic apparatus for inspecting the interior structure of an object.

Referring now in detail to the drawings, there is illustrated in FIG. 1 an acoustical holographic apparatus generally designated with the numeral 10. One of the unique features of the apparatus 10 is its ability to inspect the interior structure of an object 11 (FIG. 2) whether for nondestructive purposes or for medical diagnostic purposes without having to submerge the object in an acoustical transmitting liquid medium.

The apparatus 10 includes, an acoustical subsystem generally designated with the numeral 13 for forming an acoustical hologram of the object and an optical subsystem 15 for reconstructing a visual image of the object from the acoustical hologram so that the object may be viewed either in real time or from a permanent recording.

The acoustical subsystem 13 includes a base frame 18 that has vertical rails 21 and 22. An object transducer carriage 20 is slidably mounted on the rails 21 and 22 for vertical movement. The carriage 20 has a drive means 23 for moving the carriage up and down to selected positions.

A depending liquid tank 25 is supported on the carriage 20. The tank 25 has sidewalls 28 and the bottom wall 29. Preferably the sidewalls 28 are optically transparent so that the operator may view the interior of the tank during operation. The bottom wall 29 is formed of a flexible membrane material that is liquid impervious. The wall 29 is deformable to conform to at least a portion of the contour of the object. The membrane wall 29 may be considered as a coupling member for coupling the object to the acoustical subsystem.

Figure 2:
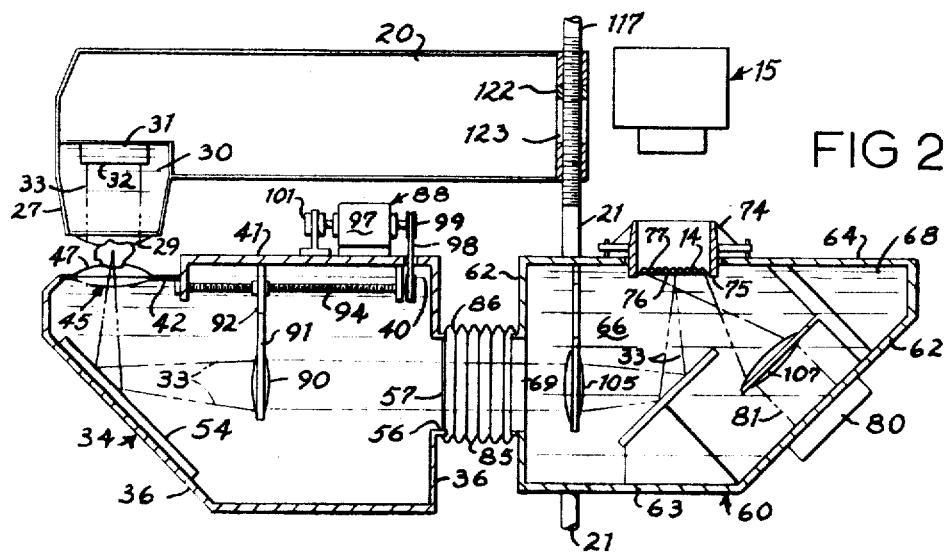
FIG. 2 is a diagrammatic vertical side view of the apparatus illustrated in FIG. 1 in which the object is positioned on a pillow between two coupling members in which one of the coupling members rides on a carriage that is vertically movable.

The liquid tank 25 is filled with an acoustical transmitting liquid 30 (FIG. 2). An acoustical piezoelectric transducer 31 is supported in the tank 25 with a downward directed face 32 immersed in the acoustical transmitting liquid 30. Acoustical transducer 31 generates and directs acoustical wave energy downwardly through the acoustical transmitting liquid 30 and through the bottom wall 29 to the object 11. Acoustical wave energy emanating from a point of the object 11 is illustrated by beam 33 and may be referred to as an object modified acoustical beam.

The acoustical subsystem 13 includes a second tank 34 that is positioned below the tank 25. The second tank is substantially stationary. The second tank 34 includes sidewalls 36 and a bottom wall 37. The tank 34 is filled with an acoustical transmitting liquid 38. The liquid 38 has a free liquid surface 40. The second tank 34 is covered with a cover plate 41 having an aperture 42 formed therein immediately below the liquid tank 25.

Figure 3:
FIG. 3 is a diagrammatic vertical cross-sectional view illustrating the structure of the pillow.

A pillow 45 is positioned in the aperture 42 for acoustically coupling the object between the pillow 45 and the flexible membrane of the bottom wall 29. The acoustical pillow 45 (FIG. 3) includes a metal frame 46 having an upper membrane layer 47 and a lower membrane layer 48 secured to the top and bottom of the frame respectively. The interior of the pillow 45 is filled with an acoustical transmitting liquid 50 to bulge the upper layer 47 upward and bulge the lower layer 48 downward. The pillow 45 rests on the cover plate 41 with the lower membrane layer 48 extending downwardly into the acoustical transmitting liquid 38 with a major portion of the layer 48 being immersed below the free surface 40 to acoustically couple the pillow to the acoustical transmitting liquid 38. When the apparatus is not being utilized, an air space is formed between the upper layer 47 of the pillow 45 and the bottom wall 29 of the upper tank. The upper layer 47 may be considered a coupling member for coupling the object in conjunction with the wall 29 to the acoustical subsystem.

An acoustical mirror 54 is positioned in the lower tank 34 to reflect the beam 33 from a vertical orientation to a horizontal orientation. The tank 34 has a wall opening 56 with an acoustical window 57 mounted therein to enable the acoustical wave energy, reflected by the mirror 54, to be directed through the wall opening 56. The acoustical wave energy from the beam 33 is received in an adjacent hologram tank 60.

The hologram tank 60 has side wall 62, a bottom wall 63 and a cover plate 64. The hologram tank 60 contains acoustical transmitting liquid 66. The liquid 66 has a free liquid surface 68. The hologram tank 60 is provided with a side opening 69 opposite to the wall opening 56 to enable the acoustical beam 33 to be transmitted from tank 34 to the hologram tank 60. An acoustical mirror 71 is positioned in the hologram tank 60 to reflect the acoustical wave energy from the horizontal orientation to a vertical orientation with the beam 33 being directed to an acoustical wave detector 14 located in a detection plane.

In the embodiment illustrated, the detector 14 is a liquid surface supported in a hologram cell 74. The hologram cell 74 has a bottom opening 75 for receiving the beam 33. The bottom opening 75 is covered with an acoustical transmitting membrane 76 with a layer of acoustical sensitive liquid 77 supported on the membrane 76 to form a ripple or wave patterns that have point-to-point correspondence with the wave front of the beam 33. An alternate detector 14 is a transducer that is moved or scanned in the detection plane to form an acoustical image after suitable signal processing. Such a detector system is described in U.S. Pat. application Ser. No. 820,862, filed May 1, 1969, now U.S. Pat. No. 3,721,312.

The acoustical subsystem 13 further includes a reference transducer 80 associated with the holographic tank 60 for producing a reference beam 81 of acoustical wave energy in the hologram tank 60 and directing the beam against the liquid detection surface 14 at a finite angle to the beam 33 so that the beams 33 and 81 overlap and interfere at the liquid detection surface 14 to form a standing wave interference pattern defining an acoustical hologram. The hologram is temporary in nature and exists only while the acoustical wave energy is being generated by the transducers 31 and 80. Alternatively the reference beam 81 for a scanned system detector 14 may be produced electrically and combined with the value received by a scanning transducer to form the acoustical hologram.

The acoustical subsystem 13 has a vibration dampening mechanism 85 (FIG. 2) interposed between the tank 34 and the hologram tank 60 to prevent any vibrations caused by the object or which exist in the tank 34 from being transmitted to the hologram tank 60. The dampening mechanism 85 includes a flexible tube 86 extending between the wall opening 56 and side opening 69.

Figure 4:
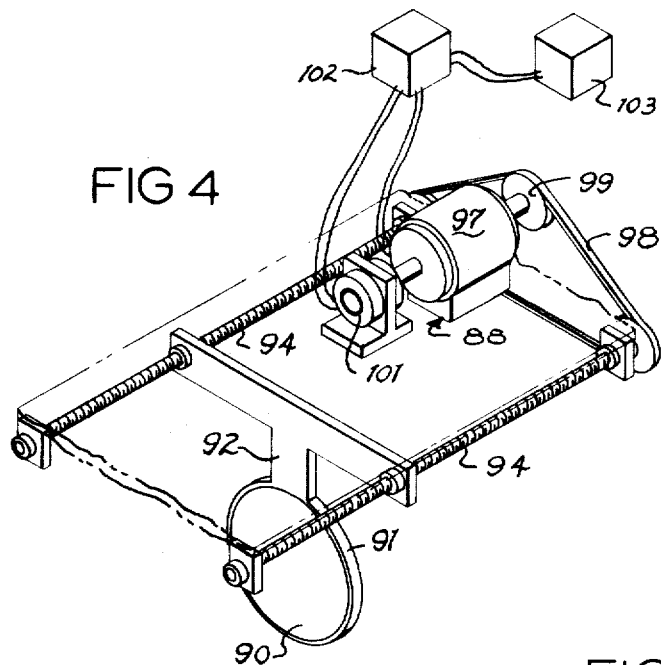
FIG. 4 is a fragmentary detailed view showing a portion of the structure illustrated in FIGS. 1 and 2.

The acoustical subsystem 13 includes an acoustical energy focusing arrangement 88. Focusing arrangement 88 includes an acoustical convex focusing lens 90 positioned in the acoustical transmitting liquid 38 having a focal point between the bottom walls 29 and the top of the pillow 45. The acoustical lens 90 is hung by a hanger frame 91 that is movably mounted on a carriage 92. The carriage 92 is movable in a horizontal direction parallel with the acoustical axis of the lens 90. Carriage 92 is driven by two rotatable parallel lead screws 94. The lead screws 94 are driven in unison by a motor 97, pulley 99 and belt 98. The motor 97 is preferably a two-phase stepping motor in which a rheostat 101 (FIG. 4) is connected to the motor and driven therewith. Rheostat 101 is part of the feed back system and is electrically connected to controller 102. A control rheostat 103 is electrically connected to the controller 102. The rheostat 103 is positioned at a control panel so that the operator may dial the desired position of the acoustical lens 90. By moving the lens 90, the lens is capable of focusing on any plane of the object. When the rheostat 103 is moved, the motor is energized to rotate the lead screws and thereby move the acoustical lens 90. When the acoustical lens has reached the desired position, the rheostat 101 balances the controller 102, automatically stopping the motor.

A second convex focusing acoustical lens 105 is mounted in the path of the beam 33 to receive the collimated object rays from acoustical lens 90 and to focus the object rays at the detection plane containing the detector 14. The acoustical lens 105 is acoustically positioned at a focal length away from the detector 14 so that the collimated object rays from lens 90 are focused at the detection plane. Such a focusing arrangement enables the operator to inspect any particular part of the object by merely focusing on that part. Or the operator can progressively move the lens 90 and progressively view the entire internal structure of the object.

The reference beam 81 has an acoustical lens 107 mounted in the path thereof to image the reference beam transducer into a plane which intersects the center of the liquid detection surface and which produces a wavefront with a radius of curvature which matches the wavefront radius of curvature of the object beam at the center of liquid surface 14. This greatly enhances the quality of the acoustical hologram at the liquid detection surface.

Initially the object is coupled to the system by placing the object on the pillow 45 and then activating the drive 23 to lower the membrane wall 29 into deformed contact with the object. The drive means 23 includes a counterweight 112 that is slidably mounted on the rails 21 and 22 in which the counterweight 112 and the carriage 20 are interconnected through cables 113 that extends over pulleys 114 mounted to frame 18. As the carriage moves downwardly the counterweight moves upwardly and vice versa. The counterweight 112 is designed to have a weight slightly less than the weight of carriage 20 and tank 25 so that the carriage 20 may move downwardly of its own weight. The drive means 23 is designed so that the carriage will not move if the carriage should meet an obstacle.

Figure 5:
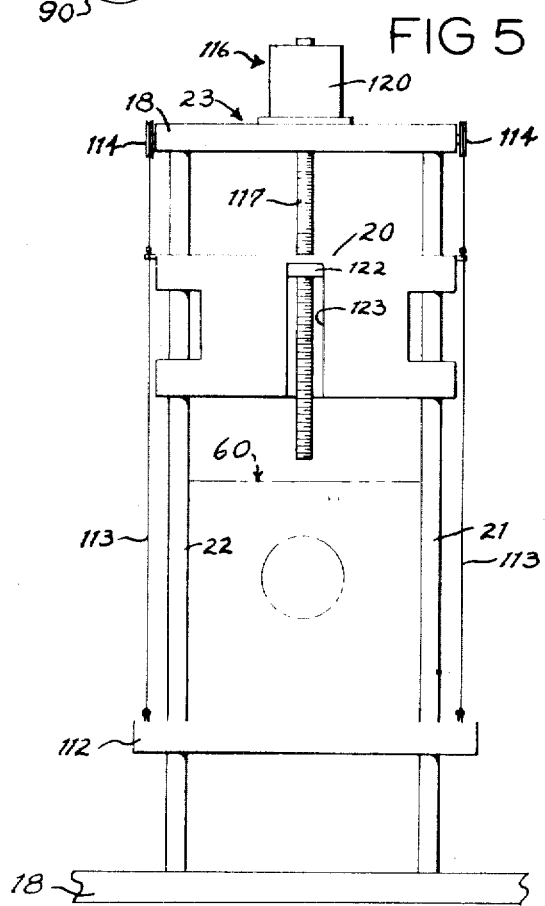
FIG. 5 is a fragmentary detailed view taken along line 4—4 in FIG. 1 illustrating a portion of the structure shown in FIGS. 1 and 2.

As shown in FIG. 5, the drive system 23 comprises a vertical carriage positioner generally designated by the numeral 116, which includes a lead screw 117 depending from a drive motor 120. Motor 120 is mounted on frame 18 to power the screw 117 to rotate and thereby raise or lower carriage 20. Carriage 20 is operatively connected to lead screw 117 by a nut 122 slidably carried within a downwardly open slot 123 in the carriage. The weight of carriage 20 is carried by nut 122 which is threadably engaged with screw 117 so that as the screw is rotated in one direction, the carriage will move downwardly by its own weight. Should the carriage encounter an obstruction while the motor 120 is energized, the nut 122 will continue moving downwardly along the slot 123 without driving the carriage further downwardly. When the screw is rotated in an opposite direction, the nut 122 engages the carriage at the upper, closed end of slot 123, and moves it upwardly.

The optical subsystem 15 is shown only in diagrammatic form. Subsystem 15 is utilized to reconstruct an image of the object from the acoustical holograms or from the received signals of a scanned transducer array according to procedures described in the patent and patent applications mentioned under the above section "Background of the Invention" and are incorporated herein by reference.

It should be understood that the above described embodiment is simply illustrative of the principles of this invention and that numerous other embodiments may be readily devised without deviating therefrom. Therefore, only the following claims are intended to define this invention.

What is claimed is:

1. Acoustical imaging apparatus for acoustically inspecting the interior structure of an object without submerging the object in an acoustical transmitting liquid, comprising:
   a first flexibly compliant, liquid impervious membrane capable of deforming to the contour of at least a portion of the object;
   a second flexibly compliant, liquid impervious membrane capable of deforming to the contour of a portion of the object, said second membrane being normally spaced from and opposing the first membrane defining an air space therebetween in which to receive the object; means operatively connected to at least one of the membranes for moving at least one of the membranes toward the other membrane bringing the membranes into pressure contact with the object to deform the membranes to the contour of the object;
   an acoustical transducer means for generating and directing acoustical wave energy through the membranes and the object interposed between the membranes to form an object modified acoustical beam containing information of the interior structure of the object;
   an acoustical detector sensitive to acoustical wave energy placed in the path of the object modified acoustical beam at a detection plane to form an image of the object modified acoustical beam at the detection plane; and
   liquid coupling means for readily transmitting the acoustical wave energy between transducer means and the first membrane and between the second membrane and the acoustical detector;
   a first acoustical lens positioned in the path of the object modified acoustical beam having a focal point between the two membranes;
   a second acoustical lens positioned in the path of the object modified acoustical beam between the first acoustical lens and the acoustical detector in which the second acoustical lens has a focal point at the detection plane for focusing acoustical rays from the first acoustical lens in the detection plane;
   means for adjusting the position of the first acoustical lens to enable the apparatus to image various planes throughout the object at the detection plane without changing the magnification of the image.

2. The acoustical imaging apparatus as defined in claim 1, wherein the acoustical detector is a liquid surface and further comprising:
   a second acoustical transducer means for generating and directing a reference beam of coherent acoustical wave energy to the liquid surface to interfere with the object modified beam to create an interference wave pattern at the liquid surface defining an acoustical hologram of the object.

3. The apparatus as defined in claim 1, further comprising:
   a first tank containing liquid coupling with the first membrane serving as a wall;
   said acoustical transducer means being mounted in the first tank;
   a second tank containing liquid coupling with the liquid coupling having a free surface; and
   a pillow supported on the second tank, said pillow having a top membrane layer and a bottom membrane layer separated by liquid coupling, said top membrane layer serving the second membrane for conforming to the contour of the object and said bottom membrane layer being immersed in the liquid coupling of the second tank.

4. The apparatus as defined in claim 1 wherein the first membrane is supported on a carriage and wherein the means for moving at least one of the membranes includes a carriage drive for moving the first membrane towards the second membrane to engage the object therebetween.

* * * * *